(12) United States Patent
Saragih et al.

(10) Patent No.: US 12,032,737 B2
(45) Date of Patent: Jul. 9, 2024

(54) GAZE ADJUSTED AVATARS FOR IMMERSIVE REALITY APPLICATIONS

(71) Applicant: Meta Platforms Technologies, LLC, Menlo Park, CA (US)

(72) Inventors: Jason Saragih, Pittsburgh, PA (US); Tomas Simon Kreuz, Pittsburgh, PA (US); Shunsuke Saito, Pittsburgh, PA (US); Stephen Anthony Lombardi, Pittsburgh, PA (US); Gabriel Bailowitz Schwartz, Seattle, WA (US); Shih-En Wei, Pittsburgh, PA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/067,603

(22) Filed: Dec. 16, 2022

(65) Prior Publication Data

US 2024/0061499 A1    Feb. 22, 2024

Related U.S. Application Data

(60) Provisional application No. 63/399,997, filed on Aug. 22, 2022.

(51) Int. Cl.
*G06F 3/01* (2006.01)
*G06T 13/40* (2011.01)

(52) U.S. Cl.
CPC .............. *G06F 3/013* (2013.01); *G06T 13/40* (2013.01)

(58) Field of Classification Search
CPC ................................ G06F 3/013; G06T 13/40
See application file for complete search history.

(56) References Cited

U.S. PATENT DOCUMENTS

| | | | | |
|---|---|---|---|---|
| 6,396,509 | B1* | 5/2002 | Cheng | G06F 3/011 715/848 |
| 6,806,898 | B1* | 10/2004 | Toyama | G06T 7/75 348/14.08 |
| 7,386,799 | B1* | 6/2008 | Clanton | A63F 13/12 715/861 |
| 9,111,384 | B2* | 8/2015 | Fein | G06T 19/006 |
| 10,137,361 | B2* | 11/2018 | Perry | G06F 3/013 |
| 10,905,943 | B2* | 2/2021 | Perry | A63F 13/34 |

(Continued)

OTHER PUBLICATIONS

EPO—International Search Report and Written Opinion for related International Application No. PCT/US2023/030832, dated Nov. 13, 2023, 12 pages.

*Primary Examiner* — Benyam Ketema
(74) *Attorney, Agent, or Firm* — McDermott Will & Emery LLP

(57) ABSTRACT

A method for updating a gaze direction for a transmitter avatar in a receiver headset is provided. The method includes verifying, in a receiver device, that a visual tracking of a transmitter avatar is active in a transmitter device, and adjusting, in the receiver device, a gaze direction of the transmitter avatar to a fixation point. Adjusting the gaze direction of the transmitter avatar comprises estimating a coordinate of the fixation point in a receiver frame at a later time, and rotating, in the receiver device, two eyeballs of the transmitter avatar to a point in a direction of the fixation point. A headset, a memory in the headset storing instructions, and a processor configured to execute the instructions to perform the above method, are also provided.

20 Claims, 6 Drawing Sheets

(56) References Cited

U.S. PATENT DOCUMENTS

| | | | |
|---|---|---|---|
| 11,176,757 B2 * | 11/2021 | Whitney | G02B 27/0093 |
| 11,348,300 B2 * | 5/2022 | Zimmermann | A63F 13/25 |
| 11,380,039 B2 * | 7/2022 | Miller, IV | G06F 3/0304 |
| 11,380,072 B2 * | 7/2022 | Stolzenberg | G06T 13/40 |
| 11,575,856 B2 * | 2/2023 | Oz | G06T 17/20 |
| 11,577,159 B2 * | 2/2023 | Mandella | A63F 13/53 |
| 2008/0309671 A1 * | 12/2008 | Shuster | G06T 13/205 |
| | | | 345/474 |
| 2012/0218301 A1 * | 8/2012 | Miller | G06Q 30/02 |
| | | | 345/633 |
| 2013/0117377 A1 * | 5/2013 | Miller | A63F 13/35 |
| | | | 709/205 |
| 2013/0125027 A1 * | 5/2013 | Abovitz | G06F 3/011 |
| | | | 715/757 |
| 2014/0078283 A1 * | 3/2014 | Nistico | G02B 27/017 |
| | | | 348/78 |
| 2014/0306866 A1 * | 10/2014 | Miller | G06F 3/013 |
| | | | 345/8 |
| 2015/0016777 A1 * | 1/2015 | Abovitz | G02B 27/0093 |
| | | | 385/37 |
| 2015/0302665 A1 * | 10/2015 | Miller | G06F 3/016 |
| | | | 345/419 |
| 2016/0026253 A1 * | 1/2016 | Bradski | H04N 13/128 |
| | | | 345/8 |
| 2016/0267699 A1 * | 9/2016 | Borke | G06F 3/017 |
| 2016/0350973 A1 * | 12/2016 | Shapira | G06F 3/011 |
| 2017/0206691 A1 * | 7/2017 | Harrises | G02B 27/0172 |
| 2017/0206694 A1 * | 7/2017 | Jiao | G06V 40/174 |
| 2018/0232928 A1 * | 8/2018 | Grant | G06T 13/40 |
| 2019/0094981 A1 * | 3/2019 | Bradski | H04N 21/414 |
| 2019/0188895 A1 * | 6/2019 | Miller, IV | G06T 19/006 |
| 2020/0209624 A1 * | 7/2020 | Sztuk | G06T 19/00 |
| 2020/0368616 A1 * | 11/2020 | Delamont | H04N 13/239 |

* cited by examiner

GAZE ADJUSTED AVATARS FOR IMMERSIVE REALITY APPLICATIONS

CROSS-REFERENCE TO RELATED APPLICATIONS

The present disclosure is related and claims priority under 35 U.S.C. § 119(e), to U.S. Prov. Appln. No. 63/399,997, filed on Aug. 22, 2022, entitled GAZE ADJUSTED AVATARS FOR IMMERSIVE REALITY APPLICATIONS, to Jason SARAGIH, et al., the contents of which are herein incorporated by reference in their entirety, for all purposes.

BACKGROUND

Field

The present disclosure is related to real-time adjustments of three-dimensional human representations for immersive reality applications. More specifically, the present disclosure is related to real-time gaze locking of avatars for social presence in virtual and augmented reality applications.

Related Art

Virtual reality, augmented reality, mixed reality, and other immersive reality applications are becoming popular with users. Typically, the realistic representation of human faces is a computationally intensive operation, often relayed to a remote server communicatively coupled with an enhanced reality headset either directly or via a mobile device paired with it. In addition to decreasing signal-to-noise ratios and therefore increasing error, these strategies may result in a time lag (e.g., latency) that creates awkward artifacts in the virtual world. One of the most notorious artifacts created by this latency is a retarded eye gaze on a transmitter/receiver avatar. This creates misunderstandings, expectations, and anxiety for two (or more) people trying to maintain a virtual conversation.

SUMMARY

In a first embodiment, a computer-implemented method includes verifying, in a receiver device, that a visual tracking of a transmitter avatar is active in a transmitter device, and adjusting, in the receiver device, a gaze direction of the transmitter avatar to a fixation point. Adjusting the gaze direction of the transmitter avatar includes estimating a coordinate of the fixation point in a receiver frame at a later time, and rotating, in the receiver device, two eyeballs of the transmitter avatar to point in a direction of the fixation point.

In a second embodiment, a system includes a memory storing multiple instructions, and one or more processors configured to execute the instructions to cause the system to perform a process. The process includes to verify that a visual tracking of a transmitter avatar is active, and to adjust, in a receiver device, a gaze direction of the transmitter avatar to a fixation point, wherein to adjust the gaze direction of the transmitter avatar the one or more processors execute instructions to estimate a coordinate of the fixation point in a receiver frame at a later time, and rotate, in the receiver device, two gaze directions from a transmitter device to track the fixation point.

In other embodiments, a non-transitory, computer-readable medium stores instructions which, when executed by a processor, cause a computer to execute a method. The method includes verifying, in a receiver device, that a visual tracking of a transmitter avatar is active in a transmitter device, and adjusting, in the receiver device, a gaze direction of the transmitter avatar to a fixation point. Adjusting the gaze direction of the transmitter avatar includes estimating a coordinate of the fixation point in a receiver frame at a later time, and rotating, in the receiver device, two eyeballs of the transmitter avatar to point in a direction of the fixation point.

In yet other embodiments, a system includes a first means to store instructions and a second means to execute the instructions to cause the system to perform a method. The method includes verifying, in a receiver device, that a visual tracking of a transmitter avatar is active in a transmitter device, and adjusting, in the receiver device, a gaze direction of the transmitter avatar to a fixation point. Adjusting the gaze direction of the transmitter avatar includes estimating a coordinate of the fixation point in a receiver frame at a later time, and rotating, in the receiver device, two eyeballs of the transmitter avatar to point in a direction of the fixation point.

These and other embodiments will be clear to one of ordinary skill in the art in light of the following.

BRIEF DESCRIPTION OF THE DRAWINGS

In the figures, elements having the same or similar reference numeral are associated with the same or similar features or attributes, unless explicitly stated otherwise.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

General Overview

In current enhanced reality or virtual reality applications, it is critical that two avatars immersed in a virtual world may interact with one another wherein the reciprocal gazes keep a real-time update as to the alleged object of interest of each avatar. For example, when two avatars have a gaze lock with one another, it is desirable that as a receiver avatar moves, the transmitter avatar keeps the gaze lock for the new position of the receiver avatar. Traditionally, this would imply that a network latency (which can be up to 200 ms or so) for the new position of the transmitter avatar's gaze to be received and processed by the receiver's headset will produce artifacts and gaps in the gaze lock between the two avatars. These gaps become glaring errors that considerably diminish the immersive feeling of the application. They break a sense of eye contact between the avatars, or a sense of smooth pursuit of objects in a receiver's control (e.g., an object that the avatar is holding), and they are very noticeable to the receiver.

In addition to network latency, the error propagation induced by the wireless, remote interaction of multiple devices, creates a source of inaccuracies that will also impact on an apparent loss of a gaze-lock configuration.

Accordingly, embodiments as disclosed herein provide a receiver headset with mechanisms and procedures to adjust the gaze of a transmitter avatar locally, without having to communicate remotely with a mobile device, a server, and ultimately the transmitter headset.

In some embodiments, in addition to avoiding problems due to network latency, techniques as disclosed herein may overcome a noise eye tracking detection system by estimating accurately a gaze fixation of a transmitter/receiver during a virtual conversation.

Example System Architecture

Figure 1:
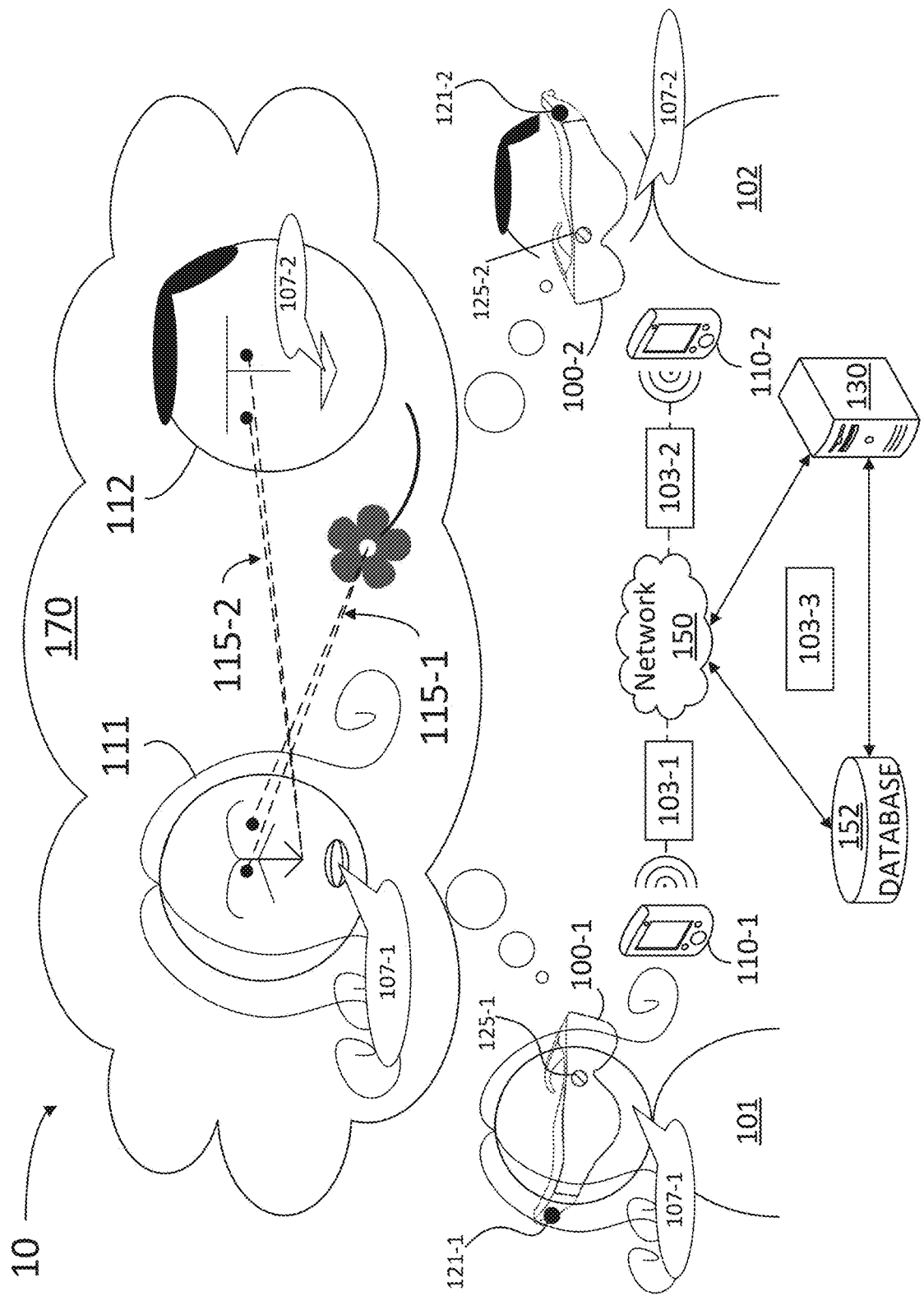
FIG. 1 illustrates a receiver and a transmitter participating in a virtual conversation using enhanced reality headsets configured for gaze locking in real time, according to some embodiments.

FIG. 1 illustrates a receiver 101 and a transmitter 102 participating in a virtual conversation using enhanced reality headsets 100-1 and 100-2 (hereinafter, collectively referred to as "headsets 100") via an architecture 10 configured for gaze locking in real time, according to some embodiments. Receiver 101 uses a first headset 100-1 and transmitter 102 uses a second headset 100-2. Each of headsets 100 may be paired with a mobile device 110-1-receiver-, and a mobile device 110-2-transmitter- and exchange datasets 103-1 and 103-2 with a remote server 130, via a network 150. Server 130 may also communicate with a remote database 152 and transmit datasets 103-3 with one another. Datasets 103-1, 103-2, and 103-3 (hereinafter, collectively referred to as "datasets 103") may include images, text, audio, and computer-generated 3D renditions of the avatars in virtual reality conversation. A receiver avatar 111 is involved in conversation with a transmitter avatar 112 in a virtual world 170. Normally, each of headsets 100 includes at least a camera 125-1 and 125-2 (hereinafter, collectively referred to as "cameras 125"), and a microphone 121-1 and 121-2 (hereinafter, collectively referred to as "microphones 121"). Cameras 125 may include an inward-looking camera as part of an eye-tracking device to detect the motion of the pupils of receiver 101/transmitter 102, during the virtual conversation. The eye tracking device can determine a gaze direction of receiver 101/transmitter 102. Microphones 121 may record a speech 107-1 from receiver 101 or a speech 107-2 from transmitter 102 (hereinafter, collectively referred to as "speeches 107"). In some embodiments, architecture 10 transmits speeches 107 to the remote server 130 via network 150, where the entire capturing of the session may take place to be fed into virtual world 170.

In embodiments consistent with the present disclosure, each one of the devices illustrated in architecture 10 may include a memory storing instructions and one or more processors configured to execute the instructions to cause each device to participate, at least partially, in methods as disclosed herein.

In virtual world 170, it is desirable to maintain a gaze 115-1 of receiver avatar 111 focused on an object of interest for receiver 101 (e.g., a flower that transmitter avatar 112 is showing to receiver avatar 111). In some embodiments, an object of interest for receiver 101 may be the eyes or the face of avatar 112, the flower, or even a moving object at a distance (e.g., a car, a train, a plane, another avatar, and the like). Accordingly, it is desirable to maintain gaze 115-1 focused on the flower for as long as the context of the conversation in virtual world 170 calls for. Reciprocally, it may be desirable to keep a gaze 115-2 of transmitter avatar 112 on the face (e.g., the eyes) of receiver avatar 111, within the context of the conversation that receiver 101 and transmitter 102 are having in virtual world 170.

In some embodiments, the processing and transmission of datasets 103 incurs in an inherent latency of network 150. Moreover, errors are expected to occur as the data transmission involves at least three devices communicating over network 150 (e.g., headsets 100, mobile devices 110, and remote server 130). Accordingly, it is desirable that headset 100-1 with receiver 101 makes a decision to adjust the gaze locking of transmitter avatar 112 before receiving an accurate rendition of such avatar from headset 100-2 through network 150. This adjustment, being a local change made by headset 100-1, is a real-time gaze locking that gives the conversation in the virtual world 170 a highly realistic impression. To assess whether a gaze locking configuration for transmitter avatar 112 is desirable, headset 100-1 may be configured to analyze the context of the conversation from speeches 107, extracting meaning and intention and other more explicit or implicit content from the conversation between receiver and transmitter.

Figure 2:
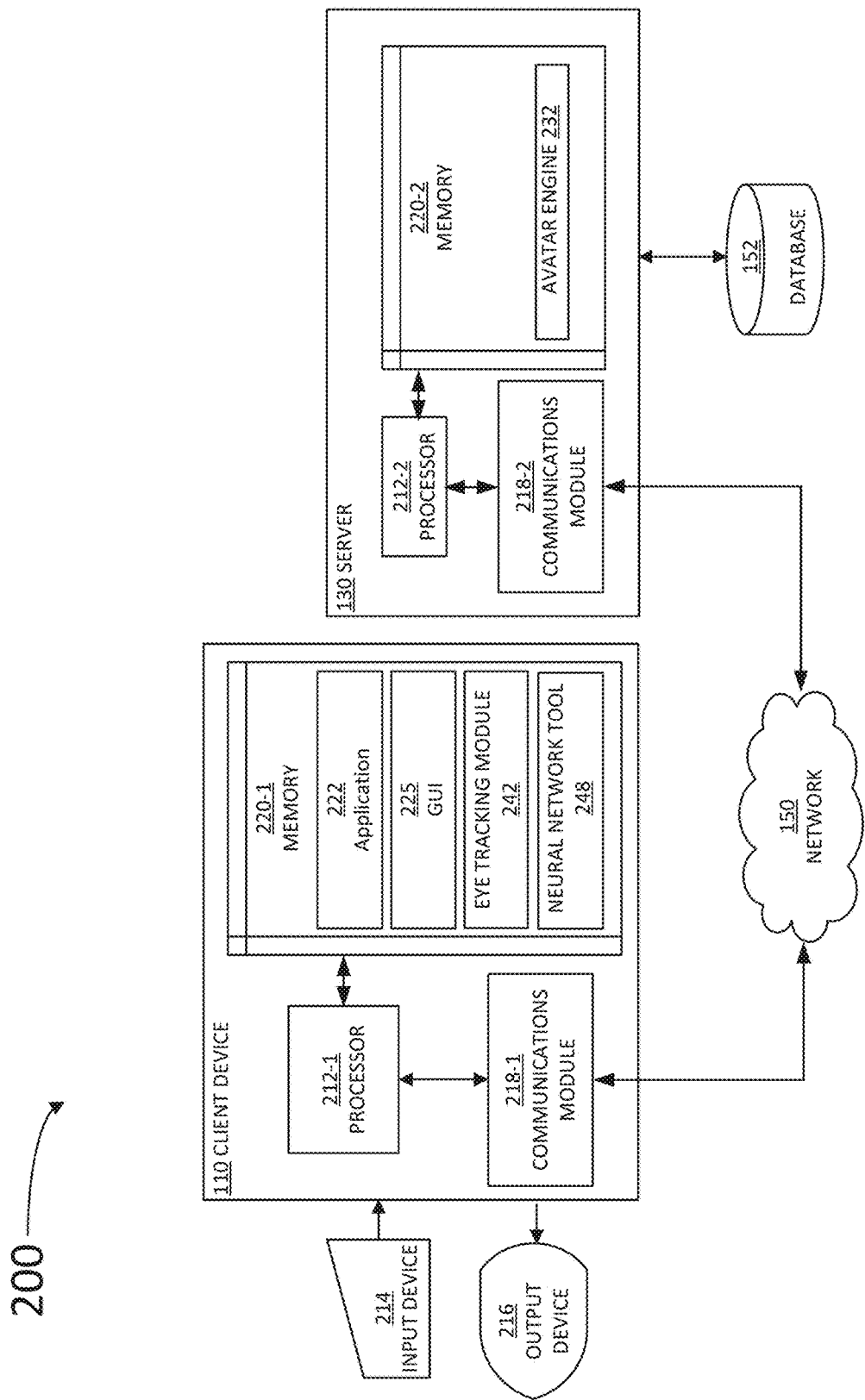
FIG. 2 is a block diagram 200 illustrating an example server 130, client device 110, and database 152 from architecture 100, according to some embodiments.

FIG. 2 is a block diagram 200 illustrating an example server 130, client device 110, and database 152 from architecture 100, according to some embodiments. Client device 110 and server 130 are communicatively coupled over network 150 via respective communications modules 218-1 and 218-2 (hereinafter, collectively referred to as "communications modules 218"). Communications modules 218 are configured to interface with network 150 to send and receive information, such as data, requests, responses, and commands to other devices via network 150. Communications modules 218 can be, for example, modems or Ethernet cards, and may include radio hardware and software for wireless communications (e.g., via electromagnetic radiation, such as radiofrequency—RF—, near field communications—NFC—, Wi-Fi, and Bluetooth radio technology). A user may interact with client device 110 via an input device 214 and an output device 216. Input device 214 may include a mouse, a keyboard, a pointer, a touchscreen, a microphone, a joystick, a virtual joystick, and the like. In some embodiments, input device 214 may include cameras, microphones, and sensors, such as touch sensors, acoustic sensors, inertial motion units—IMUs—and other sensors configured to provide input data to a VR/AR headset. For example, in some embodiments, input device 214 may include an eye tracking device to detect the position of a user's pupil in a VR/AR headset. Output device 216 may be a screen display, a touchscreen, a speaker, and the like.

Client device 110 may include a memory 220-1 and a processor 212-1. Memory 220-1 may include an application 222 and a GUI 225, configured to run in client device 110 and couple with input device 214 and output device 216. Application 222 may be downloaded by the user from server 130 and may be hosted by server 130. In some embodiments, client device 110 is a VR/AR headset and application 222 is an immersive reality application. In some embodiments, client device 110 is a mobile phone used to collect a video or picture and upload to server 130 using a video or image collection application 222, to store in training database 152. Memory 220-1 may also include an eye tracking module 242 that receives input from the eye tracking device in a headset and identifies a gaze direction of the headset user, in a virtual world (e.g., virtual world 170). Further, in some embodiments, eye tracking module 242 may also capture a pupil position and gaze direction of an avatar in the virtual world. Accordingly, eye tracking module 242 may correlate the gaze direction of a "receiver" avatar (e.g., a "local" avatar modeled on the user of client device 110) with the gaze direction of a "transmitter" avatar (e.g., an avatar that interacts with the receiver avatar and that is modeled on a user of a remote device 110). The gaze direction of the transmitter avatar may be provided to client device 110 from the remote client device used by the transmitter, via server 130. However, in some cases, a network delay may result in an outdated signal received by client device 110 regarding the gaze direction of the transmitter avatar. To avoid an awkward mismatch in gaze directions between the receiver avatar and the transmitter avatar, eye tracking module 242 may use a neural network tool 248 trained to predict a correct gaze direction of the transmitter avatar in the virtual world. In some embodiments, eye tracking module 242 is triggered to replace the current feed for the transmitter avatar gaze with a locally predicted gaze when a mismatch between the two becomes larger than a pre-selected threshold.

In some embodiments, neural network tool 248 may be part of one or more machine learning models stored in database 152. Database 152 includes training archives and other data files that may be used by eye tracking module 242 to accurately predict a gaze direction of the transmitter avatar. Moreover, in some embodiments, at least one or more training archives or machine learning models may be stored in either one of memories 220, and client device 110 may have access to them through application 222.

Neural network tool 248 may include algorithms trained for the specific purposes of the engines and tools included therein. The algorithms may include machine learning or artificial intelligence algorithms making use of any linear or non-linear algorithm, such as a neural network algorithm, or multivariate regression algorithm. In some embodiments, the machine learning model may include a neural network (NN), a convolutional neural network (CNN), a generative adversarial neural network (GAN), a deep reinforcement learning (DRL) algorithm, a deep recurrent neural network (DRNN), a classic machine learning algorithm such as random forest, k-nearest neighbor (KNN) algorithm, k-means clustering algorithms, or any combination thereof. More generally, the machine learning model may include any machine learning model involving a training step and an optimization step. In some embodiments, training database 152 may include a training archive to modify coefficients according to a desired outcome of the machine learning model.

Server 130 includes a memory 220-2, a processor 212-2, and communications module 218-2. Hereinafter, processors 212-1 and 212-2, and memories 220-1 and 220-2, will be collectively referred to, respectively, as "processors 212" and "memories 220." Processors 212 are configured to execute instructions stored in memories 220. In some embodiments, memory 220-2 includes an avatar engine 232. Avatar engine 232 may share or provide features and resources to GUI 225, including multiple tools associated with stylization, personalization, and animation, or design applications that use avatars retrieved with avatar engine 232 (e.g., application 222). The user may access avatar engine 232 through application 222, installed in a memory 220-1 of client device 110. Accordingly, application 222, including GUI 225, may be installed by server 130 and perform scripts and other routines provided by server 130 through any one of multiple tools. Execution of application 222 may be controlled by processor 212-1. In some embodiments, avatar engine 232, the tools contained therein, and at least part of training database 152 may be hosted in a different server that is accessible by server 130 or client device 110.

Figure 3:
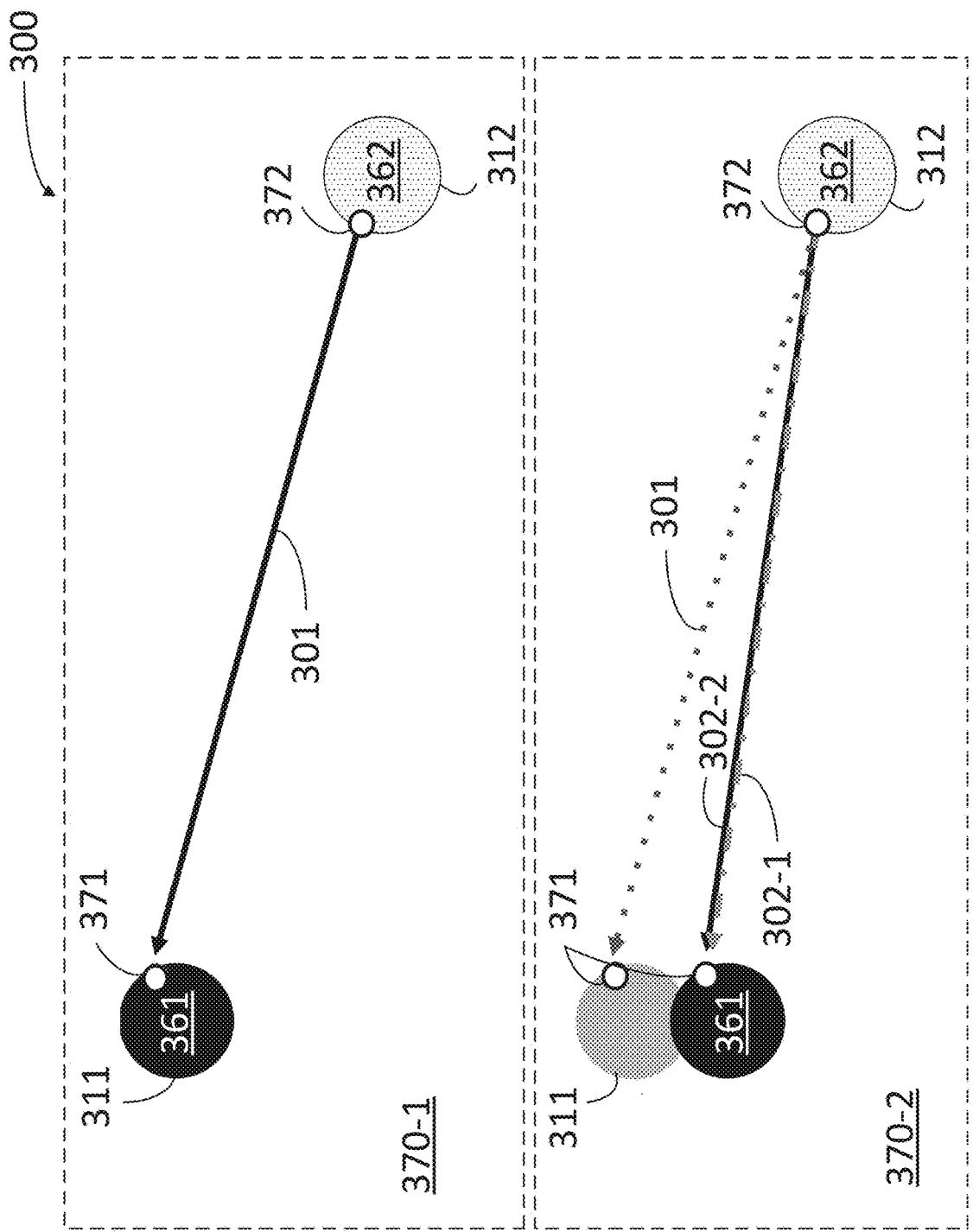
FIG. 3 illustrates a gaze adjustment of a transmitter gaze in a receiver headset, according to some embodiments.

FIG. 3 illustrates a gaze adjustment 300 from a prior configuration 370-1 to a current configuration (370-2, hereinafter, collectively referred to as "virtual world configurations 370") of a transmitter gaze 301 in a receiver headset, according to some embodiments. At a first time (configuration 370-1), a receiver avatar 311 (with eye 361 directed according to pupil 371) and a transmitter avatar 312 may have locked gazes in virtual world configurations 370. At a later time (configuration 370-2), receiver avatar 311 may have moved slightly, such as to keep a gaze lock with transmitter avatar 312. The receiver headset may adjust (locally, at the receiver headset) the position of eyes 362 (e.g., by rotating one or both pupils 372) in transmitter avatar 312 updated to account for the receiver's displacement. A predicted gaze direction 302-1 is then generated by the local headset (e.g., the headset with the user associated with receiver avatar 311). Eventually, a current gaze direction 302-2 may be provided by a transmitter headset (e.g., the headset with the user associated with transmitter avatar 312). Accordingly, the difference between predicted gaze direction 302-1 and current gaze direction 302-2 may be unnoticeable to any of the users of the receiver headset, the transmitter headset, and any other participants in virtual world configuration 370.

Figure 4:
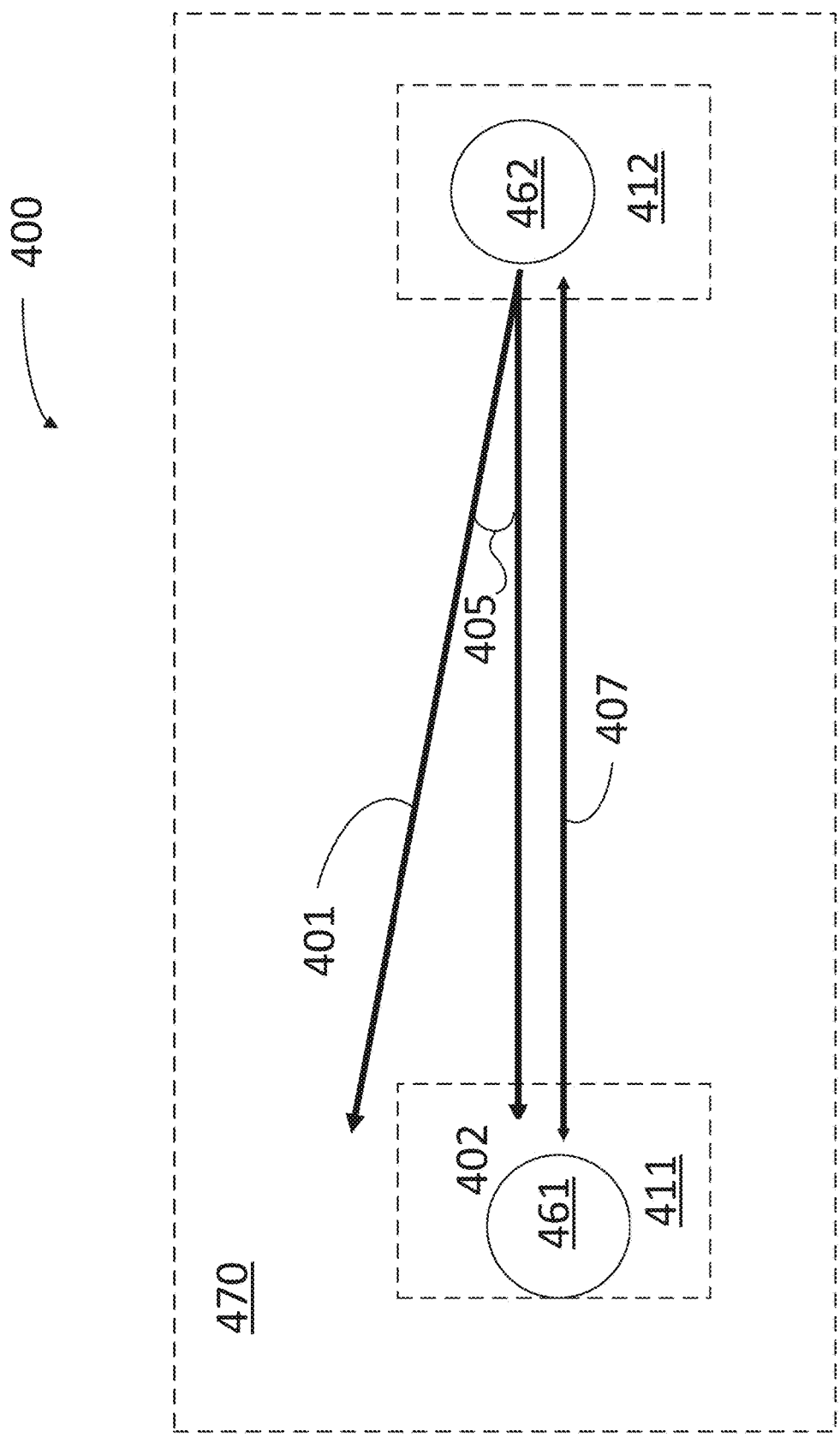
FIG. 4 illustrates world status parameters for a function to verify a gaze lock status of a transmitter avatar, according to some embodiments.

FIG. 4 illustrates world status parameters 400 for a function to verify a gaze lock status of a transmitter avatar 412 in a virtual world 470, according to some embodiments. A fixation point 402 forms a direction and a distance 407 ($d$) to a transmitter's avatar eye 462. In some embodiments, fixation point 402 is a position of the receiver's avatar pupil in the eye 461 of a receiver avatar 411 (e.g., when a gaze lock configuration is selected). In some embodiments, fixation point 402 may be an object of interest in a virtual world 470 for transmitter avatar 412. The current transmitter avatar gaze 401 makes an angle 405, $\alpha$, with the direction of fixation point 402.

An angular distance, $\delta$, may be defined as:

$$\delta = 1 - \cos \alpha \tag{1.1}$$

A distance factor, $\Delta_f$, may be defined as:

$$\Delta_f = g(\min, \max, d) + \varepsilon \tag{1.2}$$

Where g is a linear step function of a minimum distance, a maximum distance, and distance 407 ($d$), and $\varepsilon$ is a minimum factor. For example, in some embodiments:

$$g = (d - \min)/(\max - \min) \tag{1.3}$$

A function, $f$, to verify the gaze lock status of the transmitter avatar may include a mathematical expression, as follows:

$$f = \exp\{-\gamma \cdot \delta \cdot \Delta_f\} \tag{1.4}$$

Where $\gamma$ is an ad-hoc factor (e.g., $1 \times 10^{-6}$). Function, $f$, is intended to have a maximum value of one (1), when the gaze of the transmitter avatar 412 is close to fixation point 402, and a minimum value of zero (0), when the gaze of the transmitter avatar 412 is far from contact with fixation point 402. Accordingly, in some embodiments, function, $f$, is a probability value that transmitter avatar 412 has a gaze lock on the object of interest (e.g., the gaze of receiver avatar 411, or another object of interest).

In some embodiments, fixation point 402 is not a single point. For example, fixation point 402 may include multiple points (e.g., left and right eyes, separately). An uncertainty function can be used to weigh the different options.

In some embodiments, fixation point 402 may be maintained as an offset or differential value in a function $f$ (cf. Eq. 1). Accordingly, a receiver headset may track a smooth pursuit and vergence of transmitter avatar 412 and head movement (e.g., in a virtual operating room, VOR). A simplified version of local tracking (e.g., at the receiver headset) of transmitter avatar gaze 401 may include retrieving from the transmitter headset a measurement of an object/subject of eye tracking at the time of gaze estimation (at the receiver headset or the transmitter headset, based on the most current information). The state of virtual world 470 is updated locally (e.g., receiver headset) to simulate visual tracking of the object/subject. In some embodiments, a best estimate of fixation point 402 that is consistent with the state of virtual world 470 is available at the receiver headset.

In some embodiments, the function, $f$, may include a neural network or nonlinear regression approximation for transmitter avatar 412 (e.g., provided by neural network tool 248), wherein a predicted user state (t) is obtained from a function, $f$, of the user state and stage at N prior times, t−1, . . . , t−N, and a local world state (e.g., receiver headset) at the time t. In some embodiments, the local (receiver) headset may be configured to predict, estimate, and measure transmitter eye movements including saccades, corrective saccades, nystagmus (e.g., involuntary eye movements), temporal delay, and the like. In some embodiments, the local (receiver) headset may be configured to predict eye movement of the transmitter based on a conversational context and other social gestures and cues that may be captured by the receiver headset and interpreted locally using a neural network, artificial intelligence, or machine learning algorithm.

Figure 5:
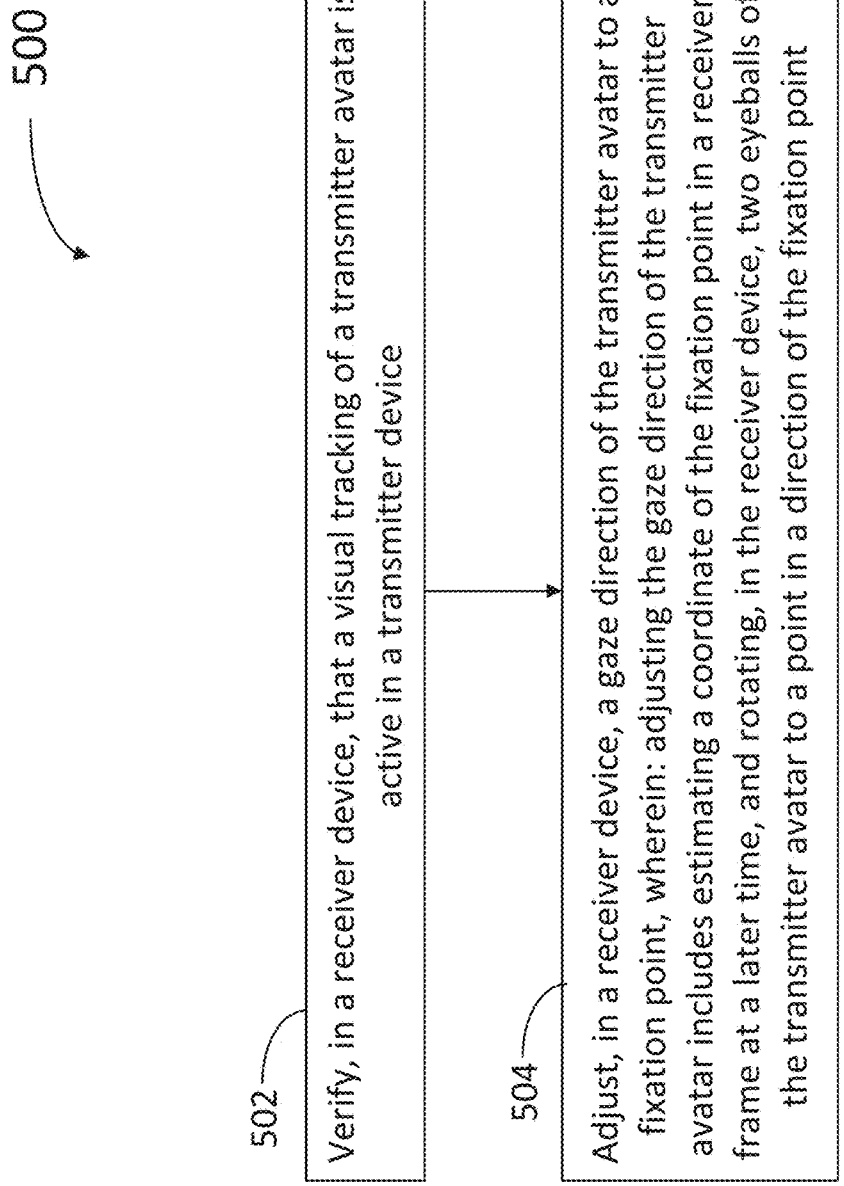
FIG. 5 is a flow chart illustrating steps in a method for gaze locking a transmitter avatar in real time for immersive reality applications, according to some embodiments.

FIG. 5 is a flow chart illustrating steps in a method 500 for gaze locking a transmitter avatar in real time for immersive reality applications, according to some embodiments. At least one or more of the steps in method 500 may be performed by one or more of the headsets, mobile devices, servers, and databases as disclosed herein (cf. architecture 10). Additionally, a memory circuit in any one of the above devices may include instructions which, when executed by one or more processor circuits in that, or any other of the above devices, may cause the device to perform at least partially one of the steps in method 500. The memory circuit may include a VR/AR application, a GUI, an eye tracking module configured to receive and process a signal from an eye tracking device, from an eye tracking module in a remote headset, or from a transmitter avatar in a virtual world associated with the user of the remote headset (e.g., application 222, GUI 225, eye tracking module 242, transmitter avatars 112, 312, and 412, and virtual worlds 170, 370, and 470). Moreover, methods consistent with the present disclosure may include at least one of the steps in method 500 performed in a different order, or simultaneously, or overlapping in time.

Step 502 includes verifying, in a transmitter device, that a visual tracking of a transmitter avatar is currently in place. In some embodiments, step 502 includes identifying a conversation between the transmitter avatar and a receiver avatar. In some embodiments, step 502 includes querying the transmitter device for a visual tracking signal. In some embodiments, step 502 includes verifying that a value of a function of a virtual distance between the transmitter avatar and a receiver avatar is greater than a pre-selected threshold.

In some embodiments, step 502 includes verifying that a value of a function of an angular difference between the gaze direction of the transmitter avatar and the fixation point is greater than a pre-selected threshold.

Step 504 includes adjusting, in a receiver device, a gaze direction of the transmitter avatar to a fixation point. In some embodiments, step 504 includes estimating a coordinate of the fixation point in a receiver frame at a later time, and rotating, in the receiver device, two gaze directions from the transmitter device to track the fixation point. In some embodiments, step 504 includes selecting for the later time a period of time shorter than a network delay for a signal to travel between the transmitter device and the receiver device. In some embodiments, the visual tracking of the transmitter avatar is a gaze lock between the transmitter avatar and a receiver avatar, and step 404 includes estimating a relative position between the transmitter avatar and the receiver avatar at the later time. In some embodiments, step 504 includes updating the gaze direction at the later time to a new gaze direction received from the transmitter device when a distance between the gaze direction and the new gaze direction is greater than a pre-selected threshold. In some embodiments, step 504 includes adjusting a head direction of the transmitter avatar based on the fixation point at the later time. In some embodiments, step 504 includes updating a world state at the later time based on a dynamic condition of the world state at a current time.

Hardware Overview

Figure 6:
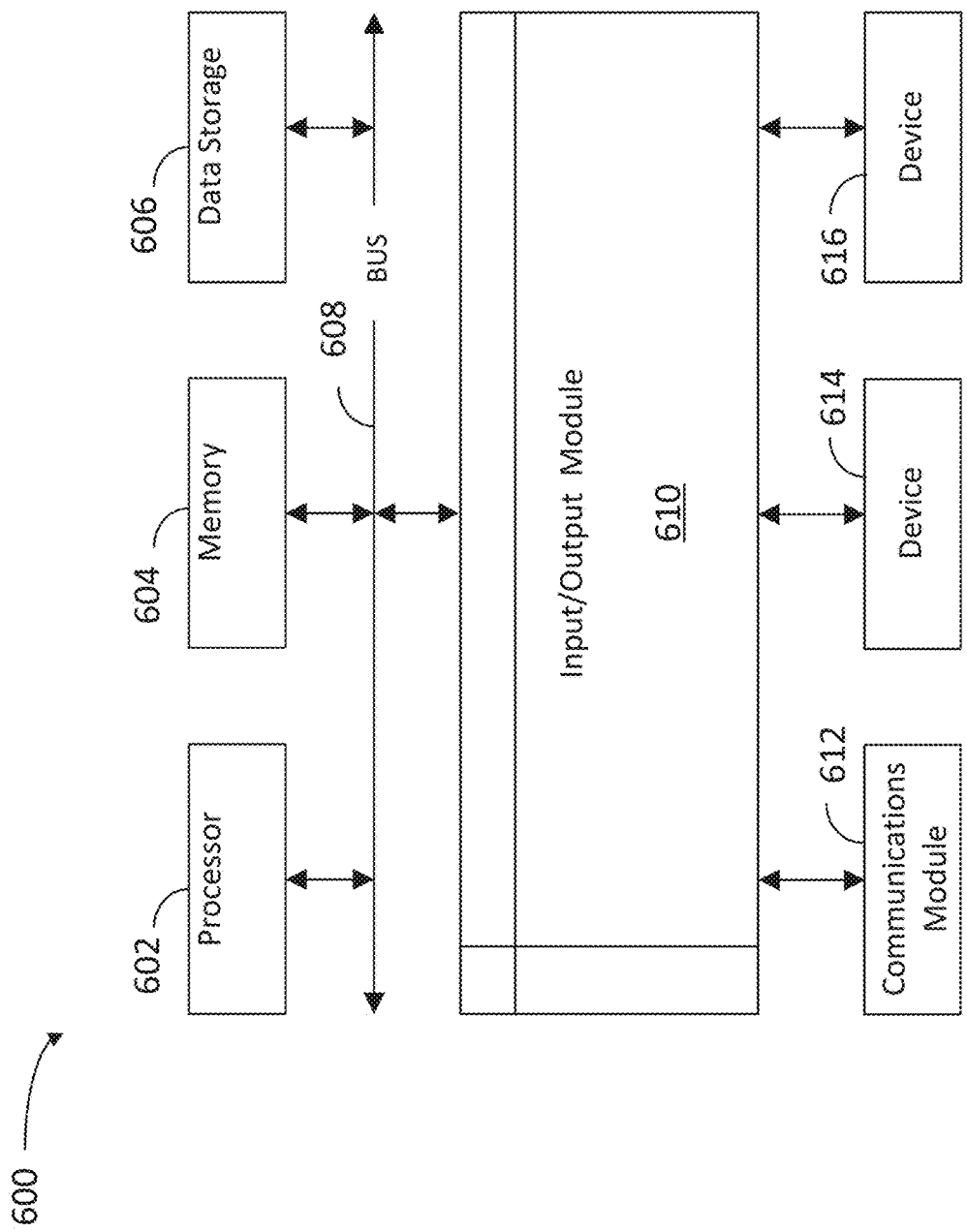
FIG. 6 is a block diagram illustrating an exemplary computer system with which headsets and other client devices, and the method in FIG. 5, can be implemented.

FIG. 6 is a block diagram illustrating an exemplary computer system 600 with which headsets and other client devices 110, and method 500 can be implemented. In certain aspects, computer system 600 may be implemented using hardware or a combination of software and hardware, either in a dedicated server, or integrated into another entity, or distributed across multiple entities. Computer system 600 may include a desktop computer, a laptop computer, a tablet, a phablet, a smartphone, a feature phone, a server computer, or otherwise. A server computer may be located remotely in a data center or be stored locally.

Computer system 600 includes a bus 608 or other communication mechanism for communicating information, and a processor 602 (e.g., processors 212) coupled with bus 608 for processing information. By way of example, the computer system 600 may be implemented with one or more processors 602. Processor 602 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 600 can include, in addition to hardware, code that creates an execution environment for the computer program in question, e.g., code that constitutes processor firmware, a protocol stack, a database management system, an operating system, or a combination of one or more of them stored in an included memory 604 (e.g., memories 220), such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled with bus 608 for storing information and instructions to be executed by processor 602. The processor 602 and the memory 604 can be supplemented by, or incorporated in, special purpose logic circuitry.

The instructions may be stored in the memory 604 and implemented in one or more computer program products, e.g., one or more modules of computer program instructions encoded on a computer-readable medium for execution by, or to control the operation of, the computer system 600, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 604 may also be used for storing temporary variable or other intermediate information during execution of instructions to be executed by processor 602.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 600 further includes a data storage device 606 such as a magnetic disk or optical disk, coupled with bus 608 for storing information and instructions. Computer system 600 may be coupled via input/output module 610 to various devices. Input/output module 610 can be any input/output module. Exemplary input/output modules 610 include data ports such as USB ports. The input/output module 610 is configured to connect to a communications module 612. Exemplary communications modules 612 include networking interface cards, such as Ethernet cards and modems. In certain aspects, input/output module 610 is configured to connect to a plurality of devices, such as an input device 614 and/or an output device 616. Exemplary input devices 614 include a keyboard and a pointing device, e.g., a mouse or a trackball, by which a consumer can provide input to the computer system 600. Other kinds of input devices 614 can be used to provide for interaction with a consumer as well, such as a tactile input device, visual input device, audio input device, or brain-computer interface device. For example, feedback provided to the consumer can be any form of sensory feedback, e.g., visual feedback, auditory feedback, or tactile feedback; and input from the consumer can be received in any form, including acoustic, speech, tactile, or brain wave input. Exemplary output devices 616 include display devices, such as an LCD (liquid crystal display) monitor, for displaying information to the consumer.

According to one aspect of the present disclosure, headsets and client devices 110 can be implemented, at least partially, using a computer system 600 in response to processor 602 executing one or more sequences of one or more instructions contained in memory 604. Such instructions may be read into memory 604 from another machine-readable medium, such as data storage device 606. Execution of the sequences of instructions contained in main memory 604 causes processor 602 to perform the process steps described herein. One or more processors in a multi-processing arrangement may also be employed to execute the sequences of instructions contained in memory 604. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., a data server, or that includes a middleware component, e.g., an application server, or that includes a front end component, e.g., a client computer having a graphical consumer interface or a Web browser through which a consumer can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 600 can include clients and servers. A client and server are generally remote from each other and typically interact through a communication network. The relationship of client and server arises by virtue of computer programs running on the respective computers and having a client-server relationship to each other. Computer system 600 can be, for example, and without limitation, a desktop computer, laptop computer, or tablet computer. Computer system 600 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 602 for execution. Such a medium may take many forms, including, but not limited to, non-volatile media, volatile media, and transmission media. Non-volatile media include, for example, optical or magnetic disks, such as data storage device 606. Volatile media include dynamic memory, such as memory 604. Transmission media include coaxial cables, copper wire, and fiber optics, including the wires forming bus 608. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

The subject technology is illustrated, for example, according to various aspects described below. Various examples of aspects of the subject technology are described as numbered claims (claim 1, 2, etc.) for convenience. These are provided as examples, and do not limit the subject technology.

In one aspect, a method may be an operation, an instruction, or a function and vice versa. In one aspect, a clause may be amended to include some or all of the words (e.g., instructions, operations, functions, or components) recited in either one or more clauses, one or more words, one or more sentences, one or more phrases, one or more paragraphs, and/or one or more clauses.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the user technology, the disclosure, the present disclosure, other variations thereof and alike are for convenience only and do not imply that a disclosure relating to such phrase(s) is essential to the user technology or that such disclosure applies to all configurations of the user technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the user technology, and are not referred to in connection with the interpretation of the description of the user technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the user technology. Moreover, nothing disclosed herein is intended to be dedicated to the public regardless of whether such disclosure is explicitly recited in the above description. No clause element is to be construed under the provisions of 35 U.S.C. § 112, sixth paragraph, unless the element is expressly recited using the phrase "means for" or, in the case of a method clause, the element is recited using the phrase "step for."

While this specification contains many specifics, these should not be construed as limitations on the scope of what may be described, but rather as descriptions of particular implementations of the user matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially described as such, one or more features from a described combination can, in some cases, be excised from the combination, and the described combination may be directed to a subcombination or variation of a subcombination.

The user matter of this specification has been described in terms of particular aspects, but other aspects can be implemented and are within the scope of the above clauses. For example, while operations are depicted in the drawings in a particular order, this should not be understood as requiring that such operations be performed in the particular order shown or in sequential order, or that all illustrated operations be performed, to achieve desirable results. The actions recited in the clauses can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, drawings, and description thereof are hereby incorporated into the disclosure and are provided as illustrative examples of the disclosure, not as restrictive descriptions. It is submitted with the understanding that they will not be used to limit the scope or meaning of the clauses. In addition, in the detailed description, it can be seen that the description provides illustrative examples, and the various features are grouped together in various implementations for the purpose of streamlining the disclosure. The method of disclosure is not to be interpreted as reflecting an intention that the described user matter requires more features than are expressly recited in each clause. Rather, as the clauses reflect, inventive user matter lies in less than all features of a single disclosed configuration or operation. The clauses are hereby incorporated into the detailed description, with each clause standing on its own as a separately described user matter.

The subject technology is illustrated, for example, according to various aspects described below. Various examples of aspects of the subject technology are described as numbered claims (claim 1, 2, etc.) for convenience. These are provided as examples, and do not limit the subject technology. The claims are not intended to be limited to the aspects described herein but are to be accorded the full scope consistent with the language clauses and to encompass all legal equivalents. Notwithstanding, none of the claims are intended to embrace user matter that fails to satisfy the requirements of the applicable patent law, nor should they be interpreted in such a way.

What is claimed is:

1. A computer-implemented method, comprising:
   verifying, in a receiver device, that a visual tracking of a transmitter avatar is active in a transmitter device; and
   adjusting, in the receiver device, a gaze direction of the transmitter avatar to a fixation point, wherein:
   adjusting the gaze direction of the transmitter avatar comprises estimating a coordinate of the fixation point in a receiver frame at a later time, and rotating, in the receiver device, two eyeballs of the transmitter avatar to a point in a direction of the fixation point; and
   adjusting the gaze direction of the transmitter avatar before receiving rendition information for the transmitter avatar from the transmitter device.

2. The computer-implemented method of claim 1, wherein verifying that a visual tracking of a transmitter avatar is currently in place comprises identifying a conversation between the transmitter avatar and a receiver avatar.

3. The computer-implemented method of claim 1, wherein verifying that a visual tracking of a transmitter avatar is currently in place comprises querying the transmitter device for a visual tracking signal.

4. The computer-implemented method of claim 1, wherein verifying that a visual tracking of a transmitter avatar is currently in place comprises verifying that a value of a function of a virtual distance between the transmitter avatar and a receiver avatar is greater than a pre-selected threshold.

5. The computer-implemented method of claim 1, wherein verifying that a visual tracking of a transmitter avatar is currently in place comprises verifying that a value of a function of an angular difference between the gaze direction of the transmitter avatar and the fixation point is greater than a pre-selected threshold.

6. The computer-implemented method of claim 1, further comprising selecting for the later time a period of time shorter than a network delay for a signal to travel between the transmitter device and the receiver device.

7. The computer-implemented method of claim 1, wherein the visual tracking of the transmitter avatar is a gaze lock between the transmitter avatar and a receiver avatar, and estimating the coordinate of the fixation point comprises estimating a relative position between the transmitter avatar and the receiver avatar at the later time.

8. The computer-implemented method of claim 1, further comprising updating the gaze direction at the later time to a new gaze direction received from the transmitter device when a distance between the gaze direction and the new gaze direction is greater than a pre-selected threshold.

9. The computer-implemented method of claim 1, further comprising adjusting a head direction of the transmitter avatar based on the fixation point at the later time.

10. The computer-implemented method of claim 1, further comprising updating a world state at the later time based on a dynamic condition of the world state at a current time.

11. A system, comprising:
    a memory storing multiple instructions; and
    one or more processors configured to execute the instructions to cause the system to:
    verify that a visual tracking of a transmitter avatar is active; and
    adjust, in a receiver device, a gaze direction of the transmitter avatar to a fixation point, wherein to adjust the gaze direction of the transmitter avatar the one or more processors execute instructions to estimate a coordinate of the fixation point in a receiver frame at a later time, and rotate, in the receiver device, two gaze directions from a transmitter device to track the fixation point, and the gaze direction of the transmitter avatar is adjusted before receiving rendition information for the transmitter avatar from the transmitter device.

12. The system of claim 11, wherein to verify that a visual tracking of a transmitter avatar is currently in place the one or more processors execute instructions to identify a conversation between the transmitter avatar and a receiver avatar.

13. The system of claim 11, wherein to verify that a visual tracking of a transmitter avatar is currently in place the one or more processors execute instructions to query the transmitter device for a visual tracking signal.

14. The system of claim 11, wherein to verify that a visual tracking of a transmitter avatar is currently in place the one or more processors execute instructions to verify that a value of a function of a virtual distance between the transmitter avatar and a receiver avatar is greater than a pre-selected threshold.

15. The system of claim 11, wherein to verify that a visual tracking of a transmitter avatar is currently in place the one or more processors execute instructions to verify that a value of a function of an angular difference between the gaze direction of the transmitter avatar and the fixation point is greater than a pre-selected threshold.

16. The system of claim 11, wherein the one or more processors further execute instructions to select for the later time a period of time shorter than a network delay for a signal to travel between the transmitter device and the receiver device.

17. The system of claim 11, wherein the one or more processors execute instructions to visually track the transmitter avatar with a gaze lock between the transmitter avatar and a receiver avatar, and to estimate the coordinate of the fixation point the one or more processors execute instructions to estimate a relative position between the transmitter avatar and the receiver avatar at the later time.

18. The system of claim 11, wherein the one or more processors execute instructions to update the gaze direction at the later time to a new gaze direction received from the transmitter device when a distance between the gaze direction and the new gaze direction is greater than a pre-selected threshold.

19. The system of claim 11, wherein the one or more processors further execute instructions to adjust a head direction of the transmitter avatar based on the fixation point at the later time.

20. The system of claim 11, wherein the one or more processors further execute instructions to update a world state at the later time based on a dynamic condition of the world state at a current time.

* * * * *